Figure 1:
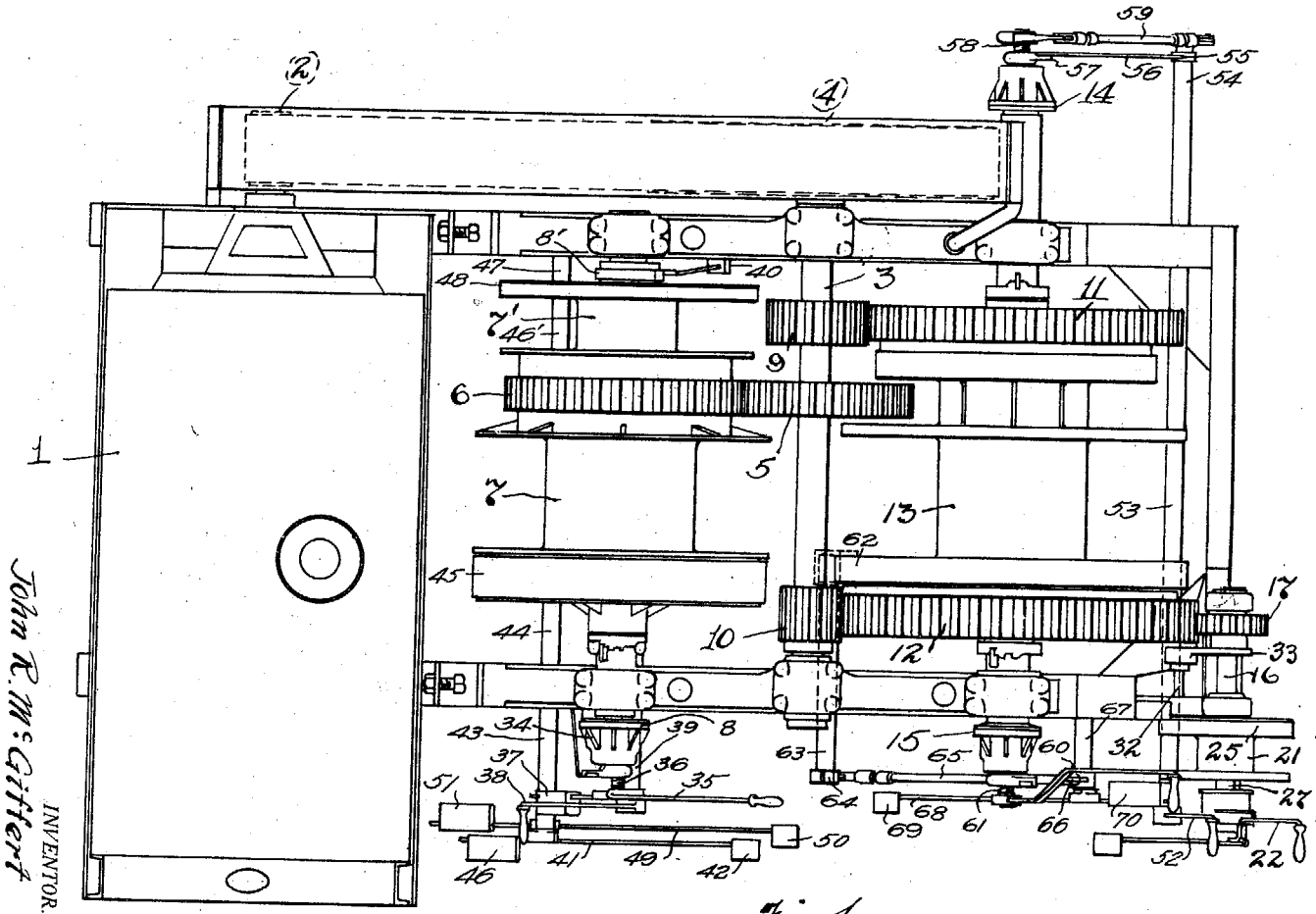

J. R. McGIFFERT

Oct. 6, 1931. WINDING ENGINE Re. 18,220

Original Filed Feb. 21, 1928 2 Sheets-Sheet 1

INVENTOR.

John R. McGiffert

BY

Fay, Oberlin & Fay

ATTORNEYS.

J. R. McGIFFERT

Oct. 6, 1931. WINDING ENGINE Re. 18,220

Original Filed Feb. 21, 1928 2 Sheets-Sheet 2

INVENTOR.
John R. McGiffert
BY
Fay, Oberlin & Fay
ATTORNEYS.

Reissued Oct. 6, 1931

Re. 18,220

UNITED STATES PATENT OFFICE

JOHN R. McGIFFERT, OF DULUTH, MINNESOTA, ASSIGNOR TO CLYDE IRON WORKS, OF DULUTH, MINNESOTA, A CORPORATION OF MAINE

WINDING ENGINE

Original No. 1,744,389, dated August 26, 1930. Application filed February 21, 1928, Serial No. 255,911. Renewed December 6, 1929. Application for reissue filed February 9, 1931. Serial No. 514,637.

The present invention relates, as indicated, to winding engines, and more particularly to a rigging mechanism for use in combination therewith. For many years, winding engines were operated by steam power. These engines, when used for logging, ordinarily comprise a motor unit, a yarding drum, a haulback drum, and a straw drum with the necessary means for transmitting power from the motor unit to said drums. The yarding drum is a relatively slow moving high powered drum, the haulback drum is a faster moving drum for hauling cable back into the woods, and the straw drum, usually on the same shaft with the haulback drum is of smaller diameter than the latter. The straw drum operates a light cable that can be carried out into the woods by hand, and is used for setting the haulback cable.

A steam engine is capable of a very flexible control—much more so than is a gasoline or other internal combustion engine. In the use of this type of machine, it is usual to place blocks for the cables at the top of a tall mast and to run the cable through said blocks. The blocks need considerable attention, and it is often necessary for a man to ascend the mast to give this necessary attention. Usual woods practice is to run a cable from the straw drum over a block at the top of the mast to haul a man up to the top of the mast by means of this cable. The flexibility of the steam engine made this operation relatively easy and safe. Present day winding engines, however, are frequently powered by internal combustion engines and the relative lack of flexibility has caused a number of accidents in the above described operation. Too often a man has been rapidly hauled to the top of such a mast and into the block. It is the object, then, of the present invention to provide an improvement in winding engines which will overcome this danger.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 2:
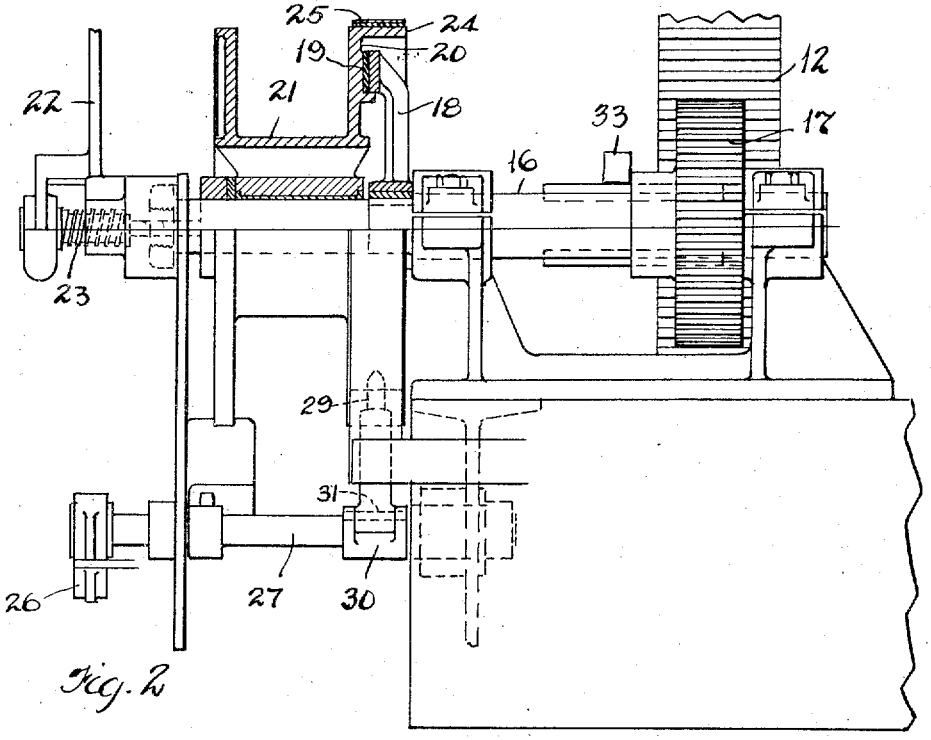
Figure 3:
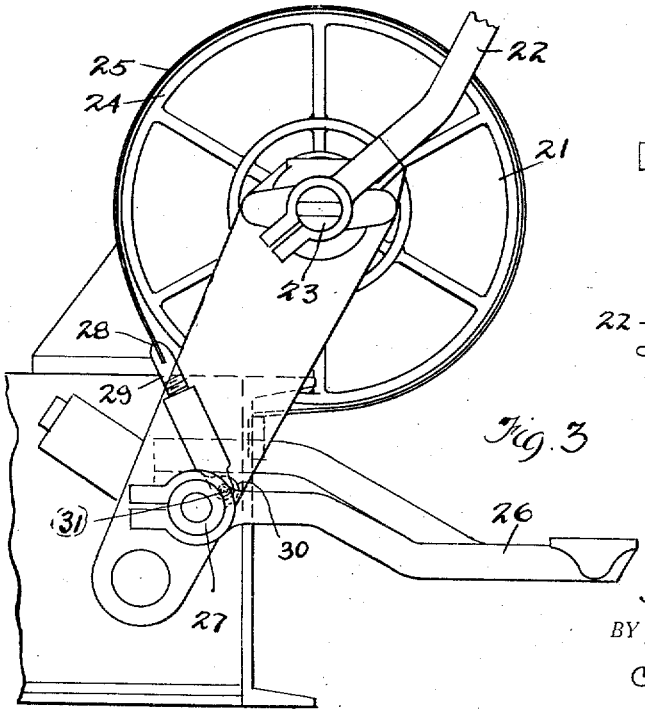
Figure 4:
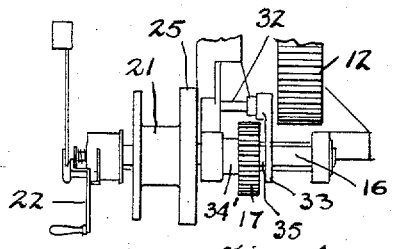

Fig. 1 is a plan view of a winding engine provided with my improvement; Fig. 2 is an end elevation of a fragment of said engine, portions thereof being shown in section; Fig. 3 is an end view of said fragment; and Fig. 4 is a plan of said fragment, certain parts being shown in different positions.

Referring more particularly to the drawings, the reference numeral 1 indicates generally a motor unit of the internal combustion type, said motor unit being provided with a spindle 2 which drives a shaft 3 through the medium of a belt 4. Said shaft 3 carries a pinion 5 meshing with a gear 6 fixedly mounted upon a shaft carrying a haulback drum 7 and a straw drum 7′. A clutch mechanism 8 is provided for clutching the drum 7 to said gear 6, and a second clutch mechanism 8′ is provided for clutching the drum 7′ to the gear 6. The clutch mechanism 8 comprises a cone clutch encased in the housing 34 and operable by a lever 35 keyed to a screw 36. As will be obvious, rotation of the lever 35 in one direction will cause the screw 36 to move the cone members into frictional engagement to drive the drum 7. A counterweight 37 at one end of the lever 35 tends to rotate the screw 36 in a direction to disengage the clutch members. The clutch mechanism 8′ is of any suitable type and is operable through the medium of a second lever 38 keyed to a shaft 39 and mounted adjacent the lever 35. Said shaft 39 extends transversely of the machine to operate the clutch mechanism 8′ and carries at its opposite end a counter-weight 40 tending to hold the mechanism 8′ disengaged. A brake lever 41 having a pedal 42 for foot operation is mounted adjacent the levers 35 and 38 but at a lower level on one end of a shaft 43 which is suitably connected at its opposite end 44 to operate a brake band 45 on the drum 7 for holding said drum against rotation. A counter-weight 46 normally holds said brake band out of retaining relation with said drum. A second brake shaft 46′ is mounted just below and in vertical alignment with said shaft 43, and said shaft 46′ is connected at its one end 47 to operate a brake band 48 on the drum 7′ and at its opposite end carries a lever 49 provided with a pedal 50 and a counter-weight 51 similar to the pedal 42 and counter-weight 46.

The shaft 3 further carries a pinion 9 smaller than said pinion 5, and a second pinion 10 smaller than said pinion 9, said pinions 9 and 10 lying upon opposite sides of the pinion 5. The pinion 9 meshes with a gear 11 and the pinion 10 meshes with a gear 12, said gears 11 and 12 being loosely mounted upon a shaft carrying a yarding drum 13. Clutch means are provided for clutching said respective gears 11 and 12 to the shaft. A cone type clutch for the gear 11 is mounted in the housing 14 and is adapted to be operated by a lever 52 carried upon a shaft 53 extending transversely of the machine. Said shaft, at its opposite end 54, carries an arm 55 to which is pivoted one end of a link 56 pivoted at its opposite end to an arm 57 connected to a screw thrust member 58 for operating the clutch elements. A second operating lever 59 is connected to said end 54 of the shaft 53 to permit operation of the clutch in the housing 14 from that side of the machine. The gear 12 may be clutched to the shaft on which the drum 13 is mounted, through the medium of a cone type clutch mounted in the housing 15, said clutch being operable by a lever 60 mounted upon a screw thrust member 61. Brake mechanism for said drum 13 comprises a brake band 62 connected for operation by a shaft 63 which carries at its one end an arm 64 to which is pivoted one end of a link 65 pivoted at its opposite end to an arm 66 carried by a stub shaft 67. Said stub shaft has keyed to its free end an operating lever 68 provided with a pedal 69 for foot operation thereof, said lever having a counter-weight 70 at its opposite end. It will be seen that the above described structure is so arranged that the gear 12 is the slowest running gear on the machine.

At the end of the machine adjacent the drum 13 there is mounted a shaft 16 having slidably keyed thereto a pinion 17. Also keyed to said shaft 16 is a clutch ring 18 carrying a friction ring 19 for cooperation with one face 20 of a rigging drum 21 loosely mounted on said shaft 16. Said drum 21 may be moved axially by means of a handle 22 and threaded member 23 so that the face 20 of drum 21 frictionally engages with the friction ring 19 of the clutch ring 18. The flange 24 of said drum 21 is circumscribed by a brake band 25, said band being adapted to be tensioned by means of a pedal or other lever 26 mounted on a shaft 27. As is clearly shown in Fig. 3, one end of said band is fixedly secured to the engine frame while the opposite end 28 is attached by means of a connection 29 to a short arm 30, said connection 29 being pivoted to said arm 30 as at 31. Adjacent said shaft 16 there is mounted a stub shaft 32 carrying a latch member 33.

As is indicated by its name, the drum 21 is adapted to be used in the rigging operation. It will be seen that this drum 21 is of light construction and is driven through the pinion 17 from the slowest moving gear on the machine, viz., the gear 12. Said drum is further loosely mounted on the shaft 16 and adapted to be connected thereto by means of a flat friction clutch, and further said drum is provided with a separate brake 25. Thus it will be seen that close control of the drum 21 is provided.

When the engine is to be operated in any one of the three usual ways, the latch 33 is turned toward the left in Fig. 1, and the pinion 17 is slid by hand or by any other well known means (not shown) along the shaft 16 until it no longer meshes with the gear 12. The latch 33 is then swung into the position illustrated in Fig. 4 where it cooperates with a collar 35 on said pinion 17 to prevent any possibility of the latter sliding into engagement with the gear 12. When the engine is to be used in rigging a mast, however, the latch 33 is thrown out of engagement with the pinion 17 and the latter is slid along the shaft 16 until it reaches the position shown in Fig. 1. The latch 33 is then thrown back into the position illustrated in Fig. 1 where it cooperates with the collar 34′ to hold the pinion 17 positively in engagement with the gear 12. The motor unit is now started, and the shaft 16 is slowly rotated. If the handle 22 is now operated to bring the drum 21 into contact with the clutch ring 18, said drum will likewise be slowly rotated to draw in on the rigging cable. Absolute control of said drum is had at all times by the operator who may keep his hand upon the handle 22 and his foot upon the pedal 26. The rotation of the drum 21 may be stopped at any moment by relieving its pressure against the clutch ring 18 and tensioning the brake 25. The drum 21 may be rotated at a speed even less than that normally provided by the various gear reductions by engaging the drum 21 with the clutch ring 18 very lightly to allow a slight slip between the same and said drum. It will thus be seen that I have provided means whereby the rigging cable used in connection with a winding engine is under absolute and delicate control of the operator at all times.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In combination with a yarding engine comprising a motor unit, a yarding drum, a haulback drum, a straw drum, and means for selectively driving said drums from said motor unit including a gear loosely mounted on the shaft carrying said yarding drum, a shaft mounted adjacent to and parallel with said drum-carrying shaft, a rigging drum loosely mounted on said last-named shaft, and a pinion slidably mounted on said last-named shaft and adapted to be slid into or out of mesh with said gear.

2. In combination with a yarding engine comprising a motor unit, a yarding drum, a haulback drum, a straw drum, and means for selectively driving said drums from said motor unit including a gear loosely mounted on the shaft carrying said yarding drum, a shaft mounted adjacent to and parallel with said drum-carrying shaft, a rigging drum loosely mounted on said last-named shaft, a pinion slidably mounted on said last-named shaft and adapted to be slid into or out of mesh with said gear, a stub-shaft mounted adjacent said last-mentioned shaft, and a latch pivotally mounted on said stub-shaft, said latch being adapted to be swung into engagement with said pinion to prevent shifting thereof.

3. In combination with a yarding engine comprising a motor unit, a yarding drum, a haulback drum, a straw drum, and means for selectively driving said drums from said motor unit including a gear loosely mounted on the shaft carrying said yarding drum, a shaft mounted adjacent to and parallel with said drum-carrying shaft, a rigging drum loosely mounted on said last-named shaft, means for clutching said rigging drum to said last-named shaft, and a pinion slidably mounted on said last-named shaft and adapted to be slid into or out of mesh with said gear.

4. In combination with a yarding engine comprising a motor unit, a yarding drum, a haulback drum, a straw drum, and means for selectively driving said drums from said motor unit including a gear loosely mounted on the shaft carrying said yarding drum, a shaft mounted adjacent to and parallel with said drum-carrying shaft, a rigging drum loosely mounted on said last-named shaft, means for clutching said rigging drum to said last-named shaft, brake means for said rigging drum, a pinion slidably mounted on said last-named shaft and adapted to be slid into or out of mesh with said gear, a stub-shaft mounted adjacent said last-mentioned shaft, and a latch pivotally mounted on said stub-shaft, said latch being adapted to be swung into engagement with said pinion to prevent shifting thereof.

5. In combination with a yarding engine comprising a motor unit, a yarding drum, a haulback drum, a straw drum, and means for selectively driving said drums from said motor unit including a gear loosely mounted on the shaft carrying said yarding drum, a shaft mounted adjacent to and parallel with said drum-carrying shaft, a rigging drum loosely mounted on said last-named shaft, means for clutching said rigging drum to said last-named shaft, and a pinion mounted on said last-named shaft and adapted to engage with said gear.

Signed by me, this 4th day of February, 1931.

JOHN R. McGIFFERT.